United States Patent [19]

Sattler et al.

[11] Patent Number: 4,883,584

[45] Date of Patent: Nov. 28, 1989

[54] PROCESS OF SEPARATING SPECIAL STEEL COMPONENTS FROM LUMP SHREDDER SCRAP

[75] Inventors: Hans-Peter Sattler, Bad Homburg; Bernd Nichtweiss, Frankfurt am Main, both of Fed. Rep. of Germany

[73] Assignee: Metallgesellschaft AG, Frankfurt am Main, Fed. Rep. of Germany

[21] Appl. No.: 114,167

[22] Filed: Oct. 27, 1987

[30] Foreign Application Priority Data

Nov. 14, 1986 [DE] Fed. Rep. of Germany ....... 3639014

[51] Int. Cl.[4] .............................................. B03C 1/30
[52] U.S. Cl. ..................................... 209/38; 209/214; 209/219; 209/229; 209/231
[58] Field of Search ..................... 209/8, 38, 214, 219, 209/229, 231; 241/24, 79.1, 79

[56] References Cited

U.S. PATENT DOCUMENTS

| | | | |
|---|---|---|---|
| 1,890,551 | 12/1932 | Ullrich | 209/219 |
| 4,044,956 | 8/1977 | Benedetto et al. | 241/79.1 X |
| 4,245,999 | 1/1981 | Reiniger | 209/38 X |
| 4,553,977 | 11/1985 | Fry | 209/38 X |

*Primary Examiner*—Joseph J. Rolla
*Assistant Examiner*—David H. Bollinger
*Attorney, Agent, or Firm*—Sprung Horn Kramer & Woods

[57] ABSTRACT

A process for separating special steel components from lump shredder scrap includes first removing the ferromagnetic content from the shredder scrap and thereafter dividing the shredder scrap into a normal size fraction and an undersize fraction. The undersize fraction is then treated by separating the special steel content from the undersize fraction by a magnetic drum having a field strength above 0.2 tesla.

4 Claims, 1 Drawing Sheet

PROCESS OF SEPARATING SPECIAL STEEL COMPONENTS FROM LUMP SHREDDER SCRAP

BACKGROUND OF THE INVENTION

This invention relates to a process of separating the special steel content from lump shredder scrap from which the ferromagnetic content has been separated before.

From ecological and economic aspects, the recycling of useful materials recovered from waste materials is increasing in significance. Glass and paper are being separately collected on a large scale so that the used materials can be re-utilized in substantial quantities. In some areas, even plastics are selectively collected and are processed for their further use. Large-scale tests are presently being conducted regarding the recycling of beverage cans by means of automatic collecting machines.

In all of the examples mentioned, the recycling is facilitated because it is relatively easy to selectively collect the waste materials. But this is not the case with most waste material and the useful materials contained therein cannot be used unless suitable separating processes can be made available. A process or apparatus can be deemed suitable if it permits individual components or groups of materials to be separated from mixed waste materials as completely as possible and with the highest possible purity and if the expenditure involved is reasonably related to the value added.

In the Federal Republic of Germany, scrap from shredder plants becomes available at a rate of about 2 million tons per year. That scrap has the following composition:

70% ferromagnetic metals
10% nonferromagnetic metals
20% nonmetals

When the ferromagnetic metals are magnetically separated and the remaining scrap has been subjected to air separation, the resulting blend consisting of about 50% metallic materials and 50% nonmetallic materials is divided by sieving into a normal size fraction and an undersize fraction. In dependence on the intended further processing, the limiting size is selected between sieve analysis particle sizes of 12 and 25 mm. Whereas the normal size fraction is suitable for a further sorting by singling and analysis of the individual pieces or for a manual sorting, the undersize fraction could not be subjected to such processes with economically satisfactory results.

In addition to rubber, plastic, glass, stones, etc., the undersize fraction still contains about 30% metal, with average contents of 9% copper and brass, 12% aluminum, 3% zinc, 2% lead and 4% special steel or stainless steel. In an unsorted state that metal content has a value of DM 80 per 1000 kg and of about DM 2000 per 1000 kg in a completely sorted state.

Wet separating processes (performed by sink-float apparatus or jigs) are usually employed to remove from the undersize fraction the organic constituents (rubber, plastic, textiles) in a first pass and to effect a division into light and heavy fractions in a second pass. The light fraction contains about 30% aluminum, balance stones, broken glass and plastics and pieces of insulated copper wire and must be dumped because said components cannot yet be separated by an economic process. On the other hand, the heavy fraction is processed further almost exclusively by a fractional melting process in the previous practice. That process results in the production of ingots of lead and zinc, which contain about 90% lead and zinc, respectively, and in a balance consisting of a mixed scrap consisting of copper, brass and special steel. The price which is paid for that residual scrap, which contains about 60% copper and brass, is less by 450 to 550 DM per 1000 kg than the price paid for a similar scrap which is free from special steel. Pure special steel scrap costs 1000 DM, per 1000 kg. This means that the worth per 1000 kg of the underside fraction can be increased by DM 85 if the special steel can be separated from the residual scrap blend. Further advantages will be afforded if the special steel fraction is separated before the fractional melting process or even before the wet separating steps.

For this reason it is an object to provice in connection with the process mentioned first hereinbefore a method by which the special steel content can economically be separated from the undersize fraction of shredder scrap.

SUMMARY OF THE INVENTION

It has surprisingly been found that this can be accomplished in that the shredder scrap is divided into a normal size fraction and an undersize fraction, the normal size fraction is removed from the process and subjected to a separate processing, and the special steel content is separated from the undersize fraction by means of a magnetic drum having a field structure above 0.2 tesla.

It has been found that the special steel components although they are inherently non-ferromagnetic are rendered sufficiently ferromagnetic by the cutting and noncutting deformation to which they are subjected during the shredding process so that they can then be separated by means of strong magnets. This will particularly be applicable to the undersize fraction, i.e., to special steel particles in which a sufficiently large volumetric part of the austenitic structure has been transformed to martensite during the shredding operation so that their resulting magnetizability is so high that a magnetic separation from the remaining scrap particles can be performed.

In accordance with a preferred further feature of the invention an undersize fraction having a sieve analysis particle size below a size between 12 and 25 mm is separated from the shredder scrap in dependence on the intended processing of the normal size fraction. In a desirable practice, the separated fraction which substantially contains special steel is subsequently passed over a magnetic drum having a field strength of about 0.07 tesla. This will result in a separation of ferromagnetic components which may still be present and which usually contain not only iron but a number of accompanying elements. An alternative practice might be adopted in which the separated fraction which essentially contains special steel is divided into two particle size fractions having a limiting sieve analysis particle size of 6 to 8 mm, the coarser fraction is passed over a magnetic drum having a field strength of about 0.07 tesla and the finger fraction is passed over a magnetic drum having a filed strength of about 0.03 tesla.

BRIEF DESCRIPTION OF THE DRAWING

Further details will be explained with reference to the flow scheme represented in FIG. 1.

DETAILED DESCRIPTION OF THE INVENTION

Figure 1:
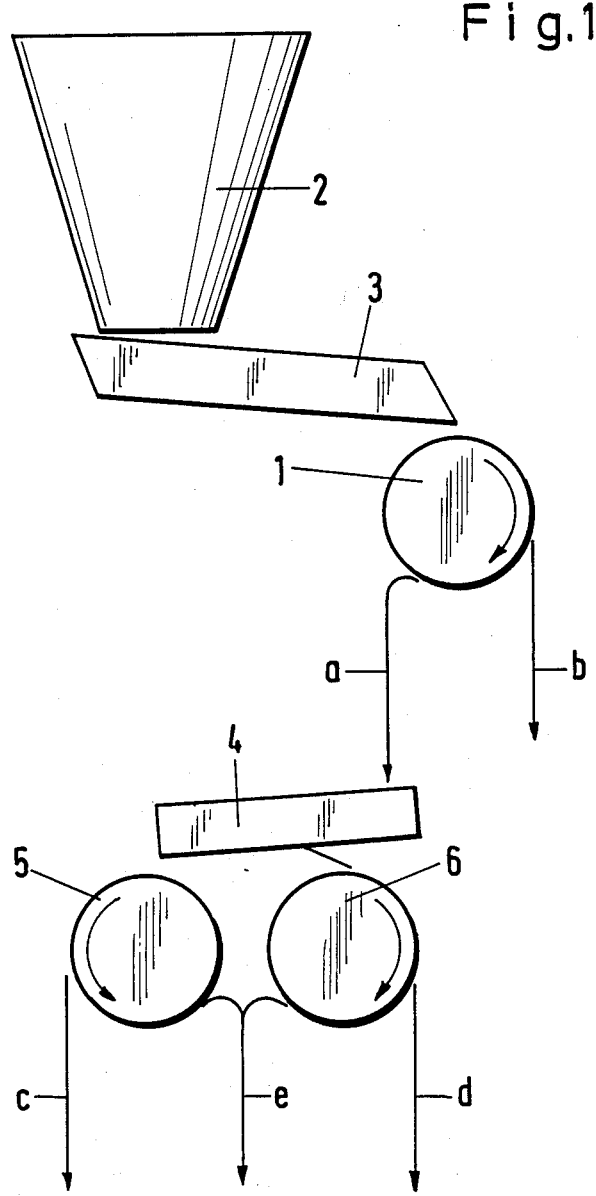

The process in accordance with the invention is suitably carried out by an apparatus which as its most important part comprises a magnetic drum 1 having a field strength of at least 0.2 tesla. From a supply bin 2, the undersize fraction of a residual scrap blend which substantially consists only of special steel, zinc, copper, brass and lead is supplied by a conveyor 3 to the drum 1 so that the special steel components which have been rendered sufficiently ferromagnetic by the shredding operation and any residual ferromagnetic particles are separated by means of the magnetic drum 1 having a high field strength. Whereas the fraction b which contains zinc, copper, brass and lead is sorted further in known manner by fractional melting processes, the fraction a which consists substantially only of special steel is delivered to a sieve 4 having a passing size of about 7 mm and is thus divided into two particle size fractions. Thereafter, the coarses fraction is passed over a magnetic drum 5 having a field strength of about 0.07 teslas and the finer fraction is passed over a magnetic drum 6 having a field strength of about 0.03 teslas. As a result, any ferromagnetic components e which may have been retained throughout the separating processes are separated from the fraction c, d which substantially contains special steel because such components would disturb the further utilization of the special steel scrap.

The selective processing of shredder scrap can be much improved by the use of the process in accordance with the invention.

What is claimed is:

1. In a process of separating special steel components from a fraction of shredder scrap from a shredding step, which fraction remains after the ferromagnetic content has been removed, the improvement comprising: dividing the fraction of shredder scrap into a normal size sub-fraction and an undersize sub-fraction, removing the normal size sub-fraction from the process and subjecting same to a separate processing, and separating from the undersize sub-fraction the special steel, the structure of which has been partly transformed from austenite into martensite during the shredding, by means of a magnetic drum having a field strength above 0.2 tesla.

2. The process according to claim 1, wherein the step of dividing comprises providing the shredded scrap with a sieve analysis such that the undersize sub-fraction has a maximum size in the range from 12 to 25 mm.

3. The process according to claim 1 or 2, further comprising passing the special steel separated from the undersized sub-fraction over a magnetic drum having a field strength of about 0.07 tesla.

4. A process according to claims 1 or 2, further comprising dividing the special steel separated from the undersized sub-fraction into two particle size fractions having a limiting analysis particle size of 6 to 8 mm, passing a coarser fraction over a magnetic drum having a field strength of about 0.07 tesla and passing a finer fraction over a magnetic drum having a field strength of about 0.03 tesla.

* * * * *